Jan. 12, 1954
H. P. CAWOOD
2,665,539
ROTATING REEL TYPE LAWN MOWER
Filed July 19, 1952
2 Sheets-Sheet 1
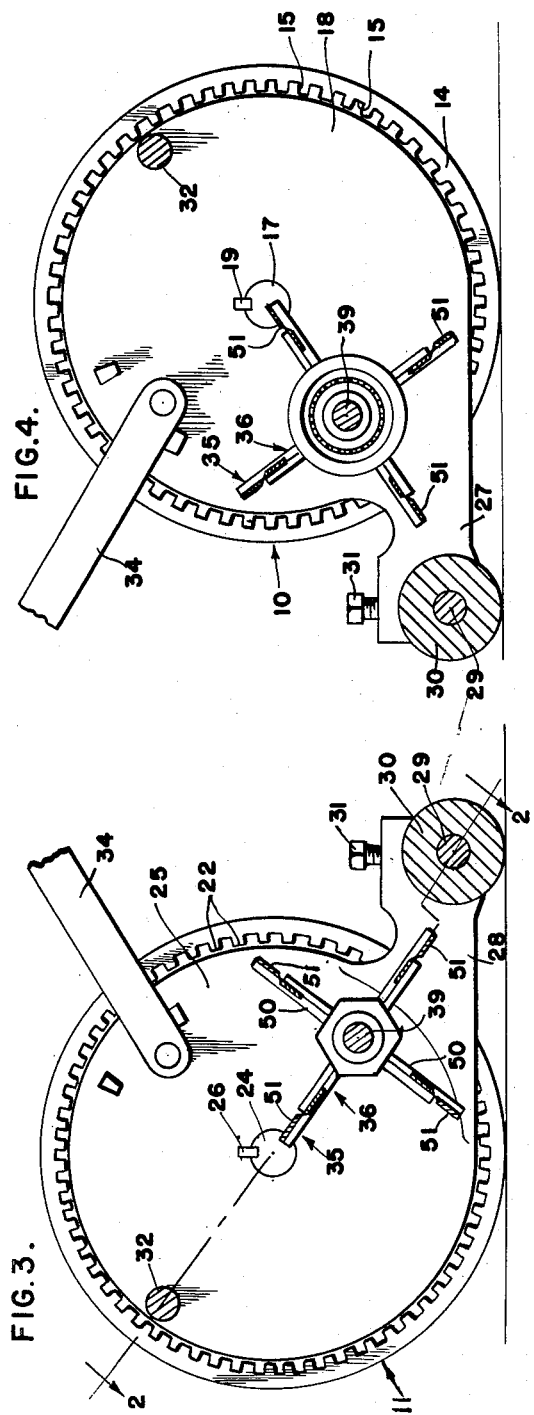
INVENTOR
HARRY P. CAWOOD
BY *John S. Burch*
ATTORNEY

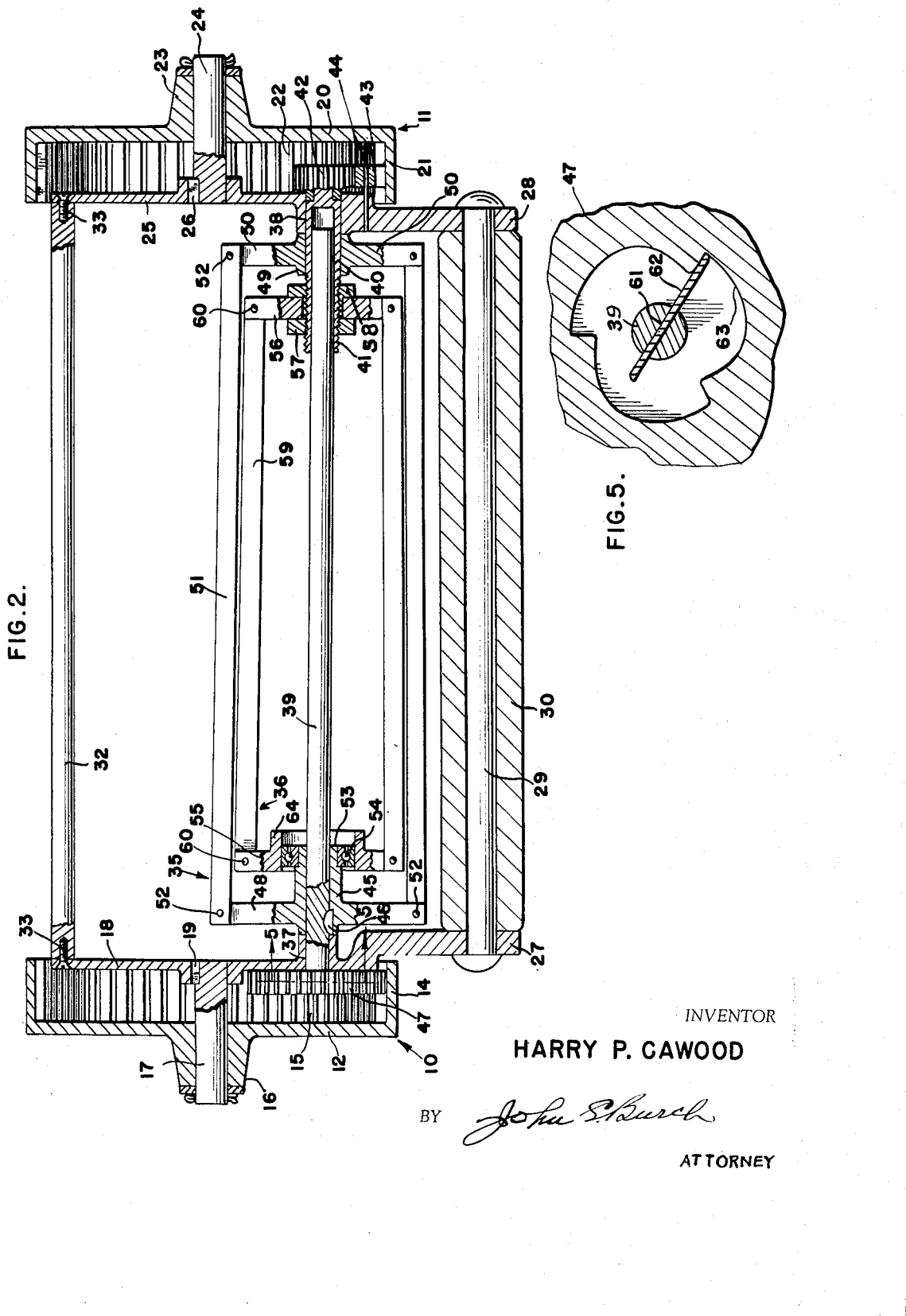

Patented Jan. 12, 1954

2,665,539

UNITED STATES PATENT OFFICE 2,665,539

ROTATING REEL TYPE LAWN MOWER

Harry P. Cawood, Topeka, Kans.

Application July 19, 1952, Serial No. 299,885

4 Claims. (Cl. 56—249)

This invention relates to a lawnmower, and more particularly to a manually operable lawnmower that embodies a pair of concentric cutting reels.

Still another object of the invention is to provide a lawnmower that embodies a pair of ground engaging wheels, a pair of rotating tapered cutting reels interposed between the cutting wheels, there being gear means operatively connecting the wheels to the reels, so that as the lawnmower is pushed along the ground, the reels will be rotated at relative speeds to thereby sever the blades of grass therebetween by a shearing action.

A still further object of the invention is to provide a lawnmower that includes a pair of ground-engaging wheels that are provided with teeth on their inner surfaces, the teeth being arranged in meshing engagement with gears that are operatively connected to a pair of rotatable tapering cutting reels which are rotated upon movement of the lawnmower, the reels being caused to rotate in opposite directions to thereby effect an accurate and efficient cutting of the blades of grass.

A still further object of the invention is to provide a lawnmower that includes a clutch which permits the device to be pulled backward without causing rotation of one of the tapered cutting reels, the pair of cutting reels being arranged one within the other and each including a plurality of spaced parallel blades for severing the blades of grass upon forward motion of the lawnmower.

A further object of the invention is to provide a lawnmower which includes a pair of tapered cutting reels that rotate in opposite directions when the lawnmower is pushed forwardly, the taper of the reels permitting the inner reel to be adjusted relative to the outer reel in order to insure that the space between the cutting blades can be regulated to insure an efficient cutting action.

Yet another object of the invention is to provide a lawnmower which will effectively cut grass and the like, the grass or stalks of various heights being chopped finely, there being ratchets or clutches provided for preventing rotation of the reels when the lawnmower is pulled backwards.

A further object of the invention is to provide a lawnmower which is extremely simple and inexpensive to manufacture.

Other objects and advantages will be apparent during the course of the following description.

In the accompanying drawings forming a part of this application, in which like numerals are used to designate like parts throughout the same:

Figure 1 is a fragmentary rear elevational view of the lawnmower constructed according to the present invention;

Figure 2 is a sectional view taken on the line 2—2 of Figure 3;

Figure 3 is an enlarged sectional view taken on the line 3—3 of Figure 1;

Figure 4 is an enlarged sectional view taken on the line 4—4 of Figure 1;

Figure 5 is an enlarged sectional view taken on the line 5—5 of Figure 2.

Referring to the drawings, the numerals 10 and 11 designate a pair of ground-engaging wheels which are arranged in spaced, parallel relation with respect to each other. The wheel 10 may be made of any suitable material, such as metal, and the wheel 10 includes a flat vertical portion 12 and an annular portion 14, there being a plurality of teeth 15 arranged on the interior surface of the portion 14 of the wheel 10 for a purpose to be later described. Formed integrally with the flat portion 12 is a bearing 16 through which extends a rotatable shaft 17.

Arranged in spaced, parallel relation with respect to the flat portion 12 is a plate 18, the plate 18 being keyed to the shaft 17 by means of a key member 19, Figure 2.

The other wheel 11 is similar in construction to the wheel 10, and the wheel 11 includes a flat portion 20 and an annular portion 21, the portion 21 being provided with a plurality of spaced teeth 22 therein. Formed integrally with the flat portion 20 is a bearing 23, and a shaft 24 extends rotatably through the bearing 23. A plate 25 is secured to an end of the shaft 24 by means of a key 26.

Extending from the plate 18 is an ear 27, while extending from the other plate 25 is a similar ear 28. A rod 29 extends between the pair of ears 27 and 28, and a ground-engaging roller 30 is mounted on the rod 29. Set screws 31 are provided for adjusting the position of the roller 30 in the usual manner. A horizontally disposed brace rod 32 extends between the pair of plates 18 and 25 and is secured thereto by suitable securing elements, such as screws 33. A handle member 34 is provided for manually moving the lawnmower along the ground, so that during forward movement of the lawnmower the blades of grass can be severed or cut effectively and efficiently.

Interposed between the pair of wheels 10 and 11 is a pair of reels which are adapted to rotate in opposite directions, the pair of reels being indicated by the numerals 35 and 36. These reels 35 and 36 are caused to rotate in opposite directions so that the blades of grass are severed by a shearing action. The rotation of the reels 35 and 36 is accomplished by a means hereinafter described. The plate 18 is provided with an opening 37 that is arranged in line with an opening 38 in the other plate 25. A shaft 39 has one end rotatably positioned in the opening 37, and a sleeve 40 is mounted on the other end of the shaft 39. The sleeve 40 is provided with an exteriorly threaded portion 41 for a purpose to be later described. Mounted on an end of the sleeve 40 and secured thereto is a gear member 42 which has its teeth arranged in meshing engagement with the teeth of an idler gear 43, Figure 2, the idler gear 43 being mounted on a shaft 44. The idler gear 43 has its teeth arranged in meshing engagement with the teeth 22 of the wheel 11.

Mounted on the shaft 39 adjacent to the wheel 10 is a bushing 45, the shaft 39 and bushing 45 being secured together by means of key 46. A gear 47 is arranged contiguous to the wheel 10, and the gear 47 has its teeth meshing with the teeth 15, the gear 47 being mounted on an end of the shaft 39.

Extending from the bushing 45 and formed integrally therewith are a plurality of radially extending arms 48. A body member 49 is rotatably mounted on the sleeve 40, and the body member 49 has a plurality of radially extending arms 50 extending therefrom. Extending between the arms 48 and the arms 50 are a plurality of blades 51, the blades 51 being secured to the arms 48 and 50 by suitable securing elements, such as screws, 52. The reel 35 is tapered, and likewise the reel 36 arranged therewithin is also tapered.

A portion 53 of the bushing 45 is of reduced diameter, and mounted on the reduced diameter portion 53 is a bearing race 54. A collar 64 embraces or surrounds the bearing race 54, and the collar 64 includes a plurality of radially extending arms 55. The reel 36 further includes a plurality of radially extending arms 56 which extend outwardly from the sleeve 40. For maintaining the arms 56 immobile in their proper position, a pair of lock nuts 57 and 58 are arranged in threaded engagement with the threaded portion 41 of the sleeve 40, the lock nuts 57 and 58 being arranged on opposite sides of the arms 56. A plurality of blades 59 extend between the arms 55 and the arms 56 and are secured thereto by suitable securing elements, such as screws, 60.

In Figure 5 there is shown details of the clutch which permits the lawnmower to be pulled backwardly or retracted without causing reverse rotation of the reel 35. This clutch includes a slot 61 that is arranged in the end of the shaft 39. A plate 62 is slidably positioned in the slot 61, and the end portions of the plate 62 are adapted to engage cam surfaces 63 that are formed on the interior of the gear 47.

In use, the handle is gripped and the lawnmower of the present invention is pushed along the lawn. The pair of wheels 10 and 11 are caused to rotate as the lawnmower is moved. Rotation of the wheel 10 causes the reel 35 to rotate, since the gear 47 meshes with the teeth 15. Likewise, rotation of the wheel 11 causes the reel 36 to rotate in the opposite direction from the reel 35, since the gear member 42 meshes with the idler gear 43 which is arranged in engagement with the teeth 22. The reels 35 and 36 rotate in opposite directions, so that the blades of grass are severed between the blades 51 and 59. It is to be noted that the arms 56 are shorter than the arms 55, and the arms 50 are shorter than the arms 48, so that the reels 35 and 36 are tapered. Thus, when the reel 36 is to be adjusted along the shaft 39 in order to control the space between the cutting blades, this tapered construction permits of the adjustment so that compensation for wear and the like can be accomplished. This adjustment is achieved by loosening lock nuts 57, 58, rotating inner reel 36 on threaded sleeve 41 until the desired clearance between blades 51 and 59 is obtained, and then tightening nuts 57, 58. Also, although only one clutch or ratchet has been shown in Figure 5, it is to be understood that a similar ratchet or clutch is provided for the wheel 11, so that rotation of the reel 36 is also prevented when the lawnmower is pulled backwardly. The wheels 10 and 11 are free to rotate on the shafts 17 and 24, but the shafts are fixedly secured to the respective plates. Also, the cutting blades 51 and 59 can be of various shapes, as for example they may be shaped spirally if desired. The lawnmower of the present invention is of the double-reel type wherein the cutting is made between the inner edges of the outer blades and the outer edges of the inner blades. The two reels rotate in a counter or opposite direction. The mower of the present invention will cut grass and the like entering at any point. Also, there will be a tendency for more of a fine mulch to be dropped, since the pieces will be chopped finer. Also, tall stalks will be topped and then cut to the desired heights.

What is claimed is:

1. In a lawn mower, a pair of vertically disposed ground engaging drive wheels, a pair of longitudinally tapered cutting reels mounted on concentric axes between said pair of wheels, said reels being tapered in the same direction, gear means between said wheels and reels for rotating one reel relative to the other reel, and means for longitudinally adjusting one reel with respect to the other for altering the clearance between the cutting blades of one reel and the cutting blades of the other wheel.

2. In a lawn mower as in claim 1, further comprising a shaft, an extension telescopically engaging said shaft and freely rotatable thereon, said gear means independently rotating said shaft and said extension, a reel mounted on one shaft for rotation therewith, and the other reel mounted on said extension for rotation therewith.

3. In a lawn mower as in claim 2, said longitudinal adjusting means comprising means for longitudinally sliding said other reel upon said extension.

4. In a lawn mower as in claim 3, said sliding means comprising a threaded joint between said extension and said other reel.

HARRY P. CAWOOD.

References Cited in the file of this patent
UNITED STATES PATENTS

| Number | Name | Date |
|--------|------|------|
| 1,844,190 | Stultz | Feb. 9, 1932 |
| 1,916,786 | Elliott | July 4, 1933 |
| 1,992,119 | Campion | Feb. 19, 1935 |